UNITED STATES PATENT OFFICE.

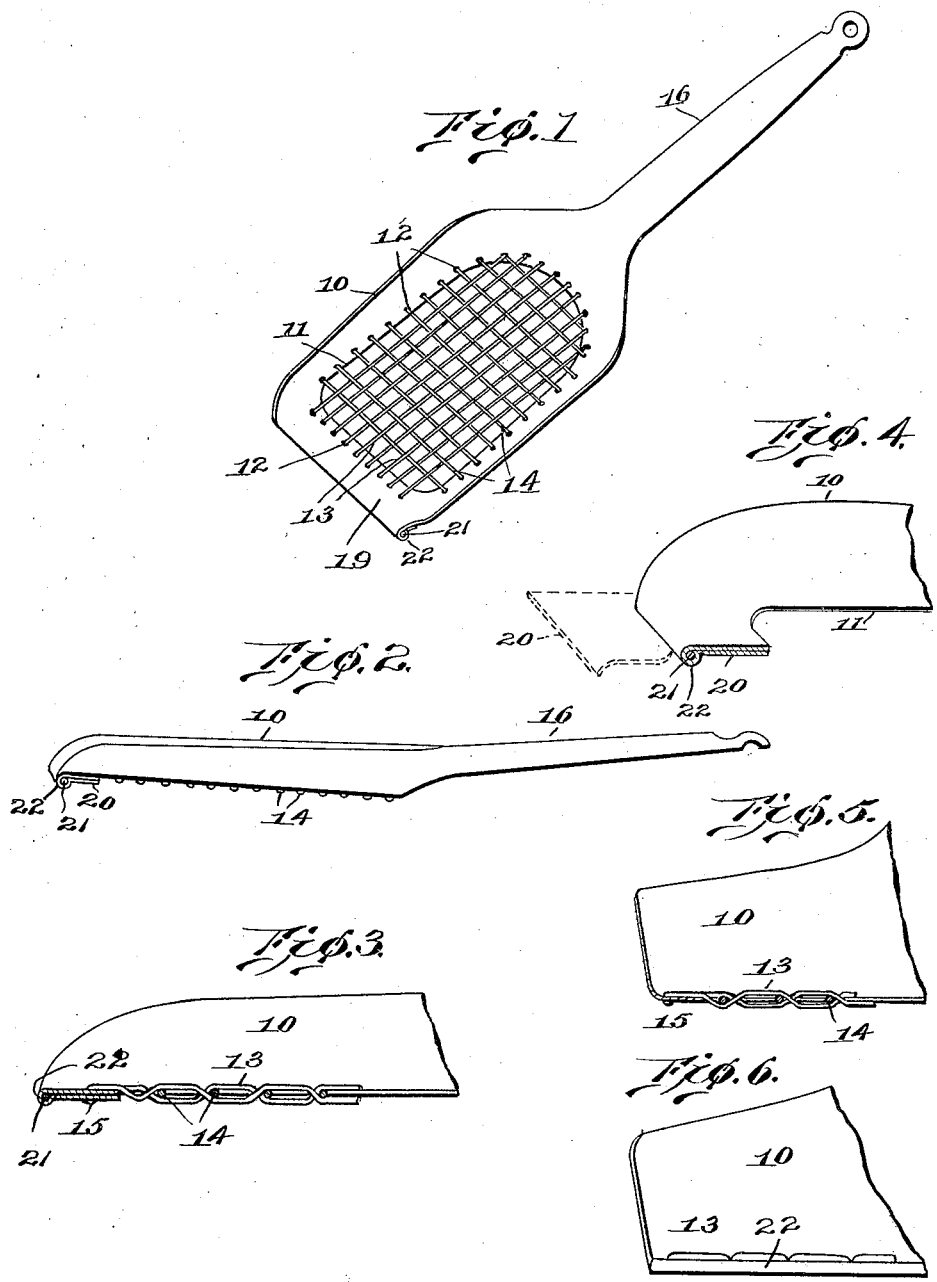

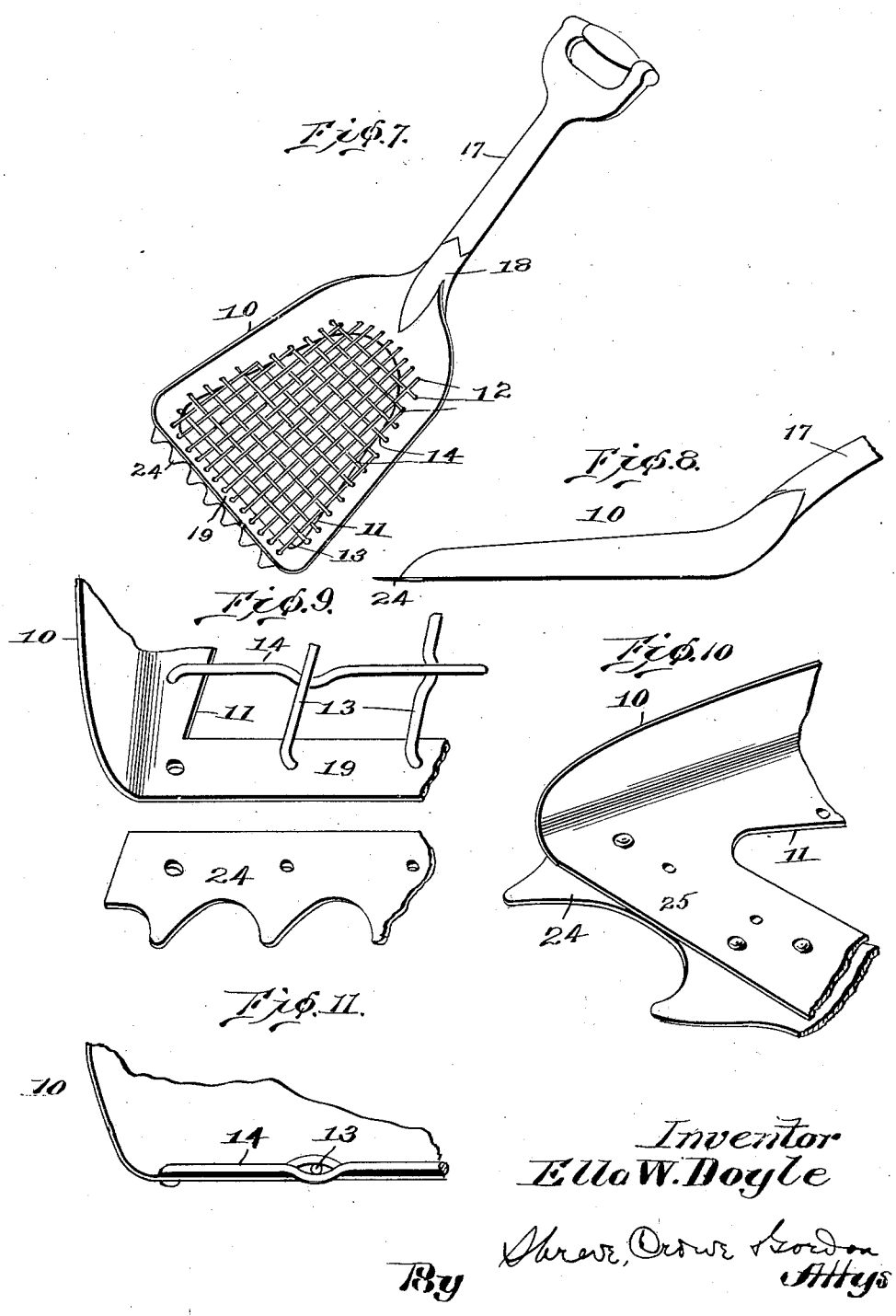

ELLA WOODNUTT DOYLE, OF ATLANTA, GEORGIA.

SHOVEL OR SCOOP.

1,427,523. Specification of Letters Patent. Patented Aug. 29, 1922.

Application filed January 13, 1921. Serial No. 437,064.

*To all whom it may concern:*

Be it known that I, ELLA W. DOYLE, a citizen of the United States, residing at Atlanta, in the county of Fulton and State of Georgia, have invented certain new and useful Improvements in Shovels or Scoops, of which the following is a specification.

This invention relates to the construction of wire mesh bottom shovels such as may be used for handling coal and ashes, and other general purposes.

The primary purpose and object of the invention is to provide a shovel of the character above mentioned which can be easily constructed; which will be convenient and labor saving; and which will serve the double purpose of taking up coal, ashes, or dirt in bulk when handled steadily, and screening or separating coal from dirt or ashes by a slight shaking or sifting action.

With the above and other objects in view which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a view, in perspective, of a domestic or hearth shovel constructed in accordance with the invention;

Fig. 2, a view in side elevation thereof;

Fig. 3, a section taken on line 3—3 of Fig. 1;

Fig. 4, a section of the shovel, in detail, showing one manner of reenforcing the same;

Fig. 5, a section taken on line 5—5 of Fig. 1;

Fig. 6, a detail section of the shovel blade presenting a front view of the reenforcement referred to above;

Fig. 7, is a view, in perspective of the invention as embodied in the larger or general type of shovel;

Fig. 8, a side view thereof;

Fig. 9, a detail view, showing a modified type of shovel in which the reenforcing member constitutes a separate unit in the construction thereof.

Fig. 10, a view, in detail, showing the manner of assembling the shovel and the separate reenforcing unit; and Fig. 11, a detail view showing an interwoven mesh bottom of slightly modified form from that disclosed in Figs. 3 and 5.

Describing the invention in detail, 10 designates the shovel blade which has provided in the bottom thereof a large opening or aperture 11, surrounded by a number of relatively spaced and smaller openings 12. Arranged over opening 11 and providing a grid or screen for sifting coal or ashes is a network of longitudinally and transversely extending wires 13 and 14, respectively, the ends of which pass through the smaller openings 12 and are riveted as shown at 15. These wires may be relatively interwoven in the manner disclosed in Figs. 3 and 5 or as illustrated in Figs. 9 and 11.

In the smaller type of shovel adapted for domestic purposes the shovel blade may have a handle 16 formed in one piece therewith, as shown in Fig. 1, while in the larger type of shovel necessary for general use the handle, shown at 17 in Fig. 7, may be a separate member fitting in a socket 18 on the shovel blade.

The edge or lip bar 19 at the forward end of the shovel blade has a transversely disposed reenforcement fastened thereto by the headed or riveted terminals of wires 13. This may consist of an extension 20 of the shovel blade, folded back against lip 19 and around wire 21 to form a lip-roll 22, as seen in Fig. 3, or it may be a separate lip-plate 23 such as shown in Fig. 9 having spikes or teeth 24 rather than a roll. The spikes are ground to a thin edge at the front to facilitate movement of the scoop or shovel through a pile of coal or other material. In addition to the method of riveting the reenforcement to the lip bar as indicated generally at 15, the former may be spot-welded to the latter, as indicated at 25.

As thus described the invention is seen to provide a shovel which not only serves the purpose of the ordinary scoop or shovel, but which also combines therewith the added facility of screening or separating the contents of the scoop by a sifting process, thus increasing the utility, and enabling coal, ashes or dirt to be readily and conveniently handled in a labor saving manner.

Having thus described my invention, and without enumerating variations and equivalents, what I desire protected by Letters Patent is as set forth in the following claims:

1. A shovel blade formed with a relatively large central opening, a grid applied to the said blade over the said opening and provided with anchoring projections passing through the blade and secured, and a reenforcing plate extending beneath the forward edge of the blade and held thereto by certain of the said projections.

2. A shovel blade formed with a relatively large central opening, a grid applied to the said blade over the said opening and provided with anchoring projections passing through the blade and secured, and a reenforcing plate extending beneath the forward edge of the blade and held thereto by certain of the said projections, said plate having teeth projected beyond the said forward edge.

3. The combination with a shovel blade of a reenforcing plate secured to the blade and provided with teeth projecting beyond the forward edge of the blade.

ELLA WOODNUTT DOYLE.